U S 0 0 7 1 3 9 8 1 4 B 2

US007139814B2

(12) United States Patent
Dinovo

(10) Patent No.: US 7,139,814 B2
(45) Date of Patent: Nov. 21, 2006

(54) DYNAMIC CONTENT DELIVERY TO STATIC PAGE IN NON-APPLICATION CAPABLE ENVIRONMENT

(75) Inventor: Matthew R. Dinovo, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 509 days.

(21) Appl. No.: 09/728,808

(22) Filed: Dec. 1, 2000

(65) Prior Publication Data

US 2002/0069255 A1 Jun. 6, 2002

(51) Int. Cl.
*G06F 15/16* (2006.01)
*G06F 15/173* (2006.01)

(52) U.S. Cl. ...................... 709/219; 709/203; 709/217; 709/226

(58) Field of Classification Search ........ 709/201–203, 709/217–219, 225; 345/749, 760
See application file for complete search history.

(56) References Cited

U.S. PATENT DOCUMENTS

| 5,973,696 | A  | * | 10/1999 | Agranat et al. | ............. | 345/760 |
| 6,121,970 | A  | * | 9/2000  | Guedalia       | ............. | 345/760 |
| 6,185,288 | B1 | * | 2/2001  | Wong           | ............. | 709/206 |
| 6,313,835 | B1 | * | 11/2001 | Gever et al.   | ............. | 715/513 |
| 6,493,733 | B1 | * | 12/2002 | Pollack et al. | ............. | 715/513 |
| 6,539,424 | B1 | * | 3/2003  | Dutta          | ............. | 709/219 |
| 6,549,612 | B1 | * | 4/2003  | Gifford et al. | ............. | 379/67.1 |
| 6,594,693 | B1 | * | 7/2003  | Borwankar      | ............. | 709/219 |
| 6,595,859 | B1 | * | 7/2003  | Lynn           | ............. | 705/14 |
| 6,871,213 | B1 | * | 3/2005  | Graham et al.  | ............. | 709/205 |
| 6,906,810 | B1 | * | 6/2005  | Senay et al.   | ............. | 358/1.1 |

OTHER PUBLICATIONS

W3C; HTML 4.01 Specification; Dec. 24, 1999; pp. 1-3 and 251-260.*
Chase, Nicholas; Active Server pp. 3.0 from Scratch; Dec. 1, 1999; Que; Introduction Section.*
Musciano et al.; HTML & XHTML: The Definitive Guide; Aug. 2000; O'Reilly & Associates, Inc.; 4th Edition; pp. 433-435.*
Microsoft Remote Scripting Webpage.

* cited by examiner

*Primary Examiner*—Rupal Dharia
*Assistant Examiner*—Quang N. Nguyen
(74) *Attorney, Agent, or Firm*—Pillsbury Winthrop Shaw Pittman LLP

(57) ABSTRACT

A system to provide dynamic content to a static page includes a database to store the dynamic content to be incorporated into the static page. A non-application capable server is provided to store the static page. The non-application capable server has no database connectivity and no ability to execute applications. A dynamic page is adapted to make a connection to the database and execute an application code. An application-capable server is provided to store the dynamic page, to parse the application code and to connect to the database. The static page incorporates the dynamic page to provide the dynamic content to the static page.

24 Claims, 2 Drawing Sheets

DYNAMIC CONTENT DELIVERY TO STATIC PAGE IN NON-APPLICATION CAPABLE ENVIRONMENT

BACKGROUND OF THE INVENTION

1. Field of the Invention

The present invention relates to Internet Web pages, and more specifically, to a system and method of providing dynamic content to a static page stored on a non-application capable server.

2. Discussion of the Related Art

Internet Web pages have become very sophisticated, incorporating not only "static" content, such as text and pictures, but "dynamic" content as well, such as scripts or programs that provide rich, dynamic content from a database. By utilizing dynamic content, Web pages may be personalized, for example, by welcoming the user to the Web site, or providing information and links customized by the user. Scripts are typically a list of operations or commands that may be executed without user interaction. Some examples of scripting languages include Visual Basic Scripting Edition (VBScript), JavaScript, and Perl.

As Internet Web sites take more dominant roles in business, the ability for a Web site to feature dynamic content is important in conveying information to a user, and/or attracting users to the Web site. Therefore, many businesses have a large Web content base, having both static content and dynamic/application content. Static content need not reside on an application-capable (script-enabled) server, while dynamic content needs to reside on an application-capable server. A non-application capable server is one that is not server-side scripting enabled, and does not have database connectivity. Accordingly, a non-application capable server does not perform any parsing of Web pages, and only serves up static pages. On the other hand, an application-capable server is adapted to interpret server-side scripting, and has database connectivity. Application-capable servers parse dynamic pages, compile server-side scripting, and insert database elements before delivering the dynamic content to a user's Internet browser.

In order to provide database-driven, personalized, and "application-like" features into a static environment, the static content is typically stored with the dynamic content on an application-capable server. However, it is preferable that static content be kept separate from the dynamic content for several reasons. When static content and dynamic content are stored separately, content authors can publish revisions to the static content (such as "journalistic-type" content, like text and still images) stored on the non-application capable servers through a document management/processing program without the fear of a wayward script being introduced into and bringing down the entire server infrastructure. Additionally, by revising only the static content stored on the non-application capable server, the approval process for making such revisions is generally easier to obtain or not necessary at all, as would be required for revising scripts or applications that are stored on application-capable servers.

Moreover, application-capable servers are much less scalable than non-application capable servers. Therefore, performance is greater if static content is kept separate from the dynamic content. But, static content and dynamic content may be stored separately only by utilizing a third-party software package residing in the server infrastructure acting as an intermediary between the database and the content, such as BroadVision Enterprise (from BroadVision, Inc., Redwood City, Calif.). However, introducing additional software components such as an intermediary software package to the server infrastructure creates greater complexity and greater opportunity for instability in the server network.

DETAILED DESCRIPTION

Figure 1:
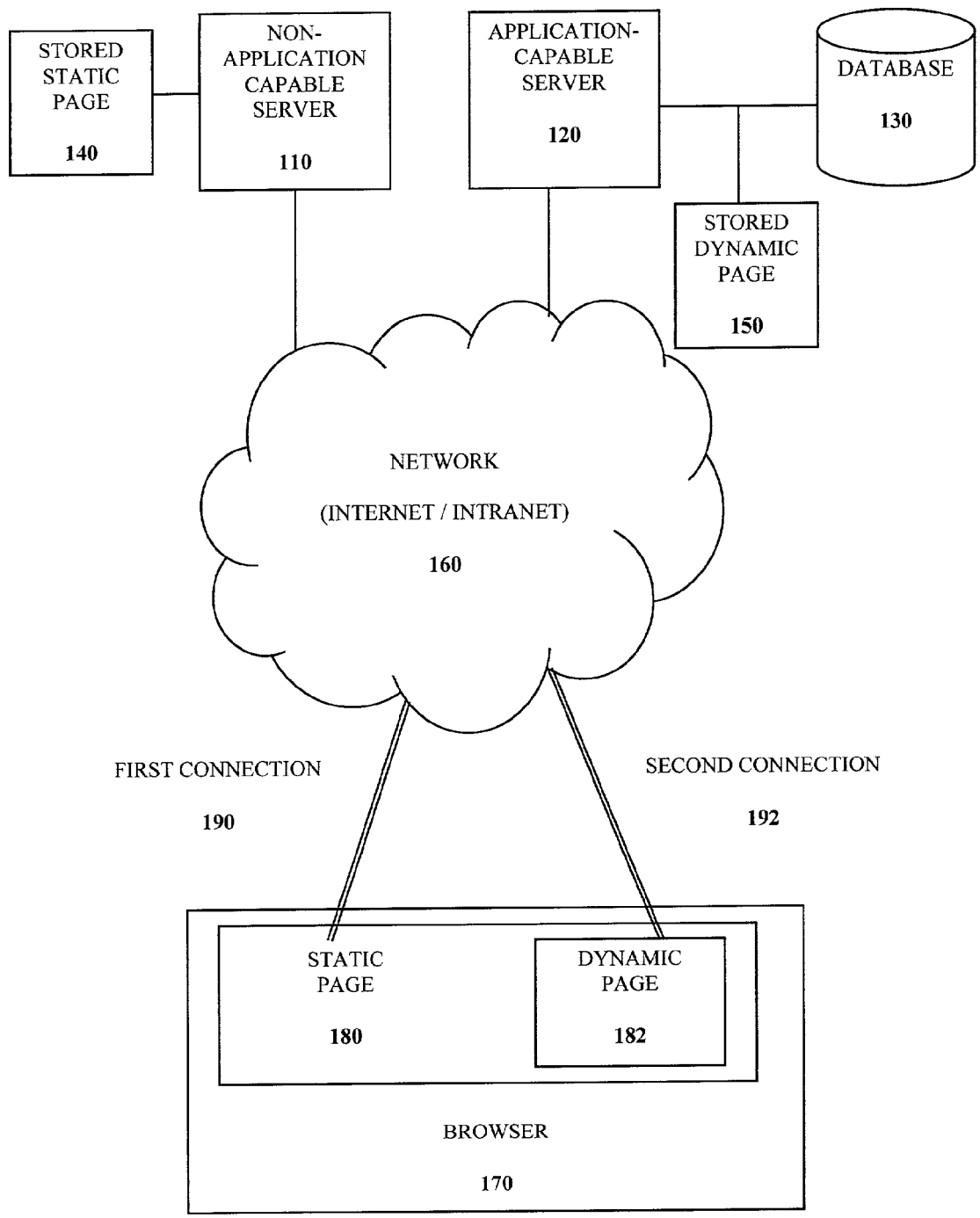
FIG. 1 illustrates a system to provide dynamic content to a static page according to an embodiment of the present invention.

FIG. 1 illustrates a system to provide dynamic content to a static page according to an embodiment of the present invention. A non-application capable server 110 is provided to serve a stored static page 140 and static content for a static page 180. The non-application capable server 110 storing the static page 140 and static content is not server-side scripting enabled and has no connections to a database 130. The database 130 is a repository of heterogeneous data elements, such as user profile data, content snippets, etc., which is to be integrated into the static page 180. The non-application capable server 110 performs no parsing of the static page 180, and only serves up static pages 180, such as HyperText Markup Language (HTML) Web pages. As mentioned above, the stored static page 140 and static content typically includes journalistic-type content, such as text and still images. The non-application capable server 110 does not store any scripts or applications, such as VBScript, JavaScript, Perl, etc.

An application-capable server 120 is provided to serve a stored dynamic page 150 and dynamic content from the database 130 for a dynamic page 182. The dynamic page 182 is adapted to make connections to the database 130 and execute application codes. That is, the dynamic page 182 includes server-side scripting elements and database connectivity. The dynamic page 182, for example, may be an Active Server Page (ASP). Utilizing ASP, applications may be executed in a server in a similar fashion to Common Gateway Interface (CGI) scripts. ASP uses the Microsoft Active X scripting engine to support, usually, VBScript or JavaScript code. Therefore, when a browser requests an ASP page, the Web server generates a page with HTML code and sends it back to the browser.

Accordingly, the application-capable server 120 has database connectivity, and is capable of interpreting server-side scripting. The application-capable server 120 is adapted to parse dynamic pages 182, compile server-side scripting, and insert database elements stored in the database 130 before delivering the dynamic page 182 to a user's browser 170, such as Netscape Navigator or Microsoft Internet Explorer. Therefore, along with the application-capable server 120, the dynamic page 182 is adapted to assemble elements retrieved from the database 130 prior to presenting it to the browser 170.

The browser 170 has a connection, preferably via a network, such as a local area network (LAN) or the Internet, to both the application-capable server 120 and the non-application capable server 110. More specifically, the static page 180 preferably has a first connection 190 to the non-application capable server 110 to receive static content for the static page 180, while the dynamic page 182 has a second connection 192 to the application-capable server 120 to receive dynamic content and elements from the database 130 for the dynamic page 182.

Figure 2:
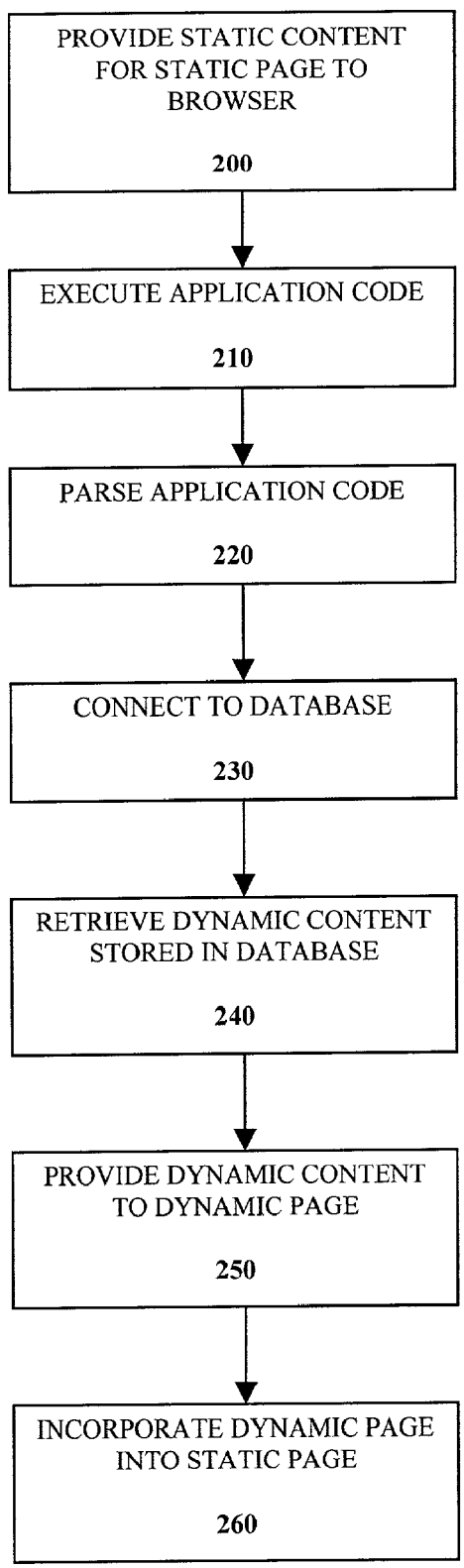
FIG. 2 illustrates a flow chart diagram of the operation of a system to provide dynamic content to a static page according to an embodiment of the present invention.

FIG. 2 illustrates a flow chart diagram of the operation of a system to provide dynamic content to a static page according to an embodiment of the present invention. A stored static page 140 and static content, including, for example, HTML code for a static page 180, is provided 200 from the non-application capable server 110 to a user's browser 170. As mentioned above, the static page 180 is preferably a journalistic-type HTML Web page having no server-side dynamic elements, such as server-side scripting or database connectivity. However, the static page 180 may contain client-side scripting, such as JavaScript.

A JavaScript reference, for example, may be made in the static page 180 similar to the following code:

<SCRIPT LANGUAGE="JavaScript" src=http://dynamic-server/myFunction.asp></SCRIPT>

This JavaScript reference may be made in the static page 180 to include modular code fragments (including the dynamic page 182) into the client-side script in the static page 180. In this case, the modular code fragment resides on the application-capable server 120. In the example illustrated by the above code, the static page 180 calls the "myFunction.asp" dynamic page 182 (an Active Server Page). The "myFunction.asp" dynamic page 182 executes 210 the application (scripting) code within the dynamic page 182 and queries the database 130 requesting the appropriate database elements based on a cookie placed in that external domain (i.e., external to the non-application capable server 110). The cookie may be used to identify users and potentially prepare customized Web pages for them. In this manner, cookies are set in the individual application's own domain (i.e., at the application-capable server 120 and not at the non-application capable server 110), and still be "accessed" by the static page 180. In reality, the application is accessing the cookie in its own domain (application-capable server 120), and pushing the results to the static page 180. By having the cookies reside at the application's own domain, bloated cookies that may reside at the master domain (i.e., the non-application capable server 110) are prevented. The "myFunction.asp" dynamic page 182 incorporates the results of the database query into a JavaScript function and writes the results to an output stream.

The above JavaScript reference may be part of a static page 180 pseudocode for welcoming a particular user to a Web site as follows:

<HEAD>
<SCRIPT LANGUAGE="JavaScript" src=http://dynamic-server/myFunction.asp></SCRIPT>
</HEAD>
<BODY>
Hello<javascript:document.write(FIRST);>
</BODY>

The following pseudocode may be part of a dynamic page 182 called by the above static page 180 pseudocode to retrieve dynamic content, i.e., the name of the particular user visiting the Web site, from the database 130 utilizing Structured Query Language (SQL):

SQL="SELECT FIRST_NAME, LAST_NAME FROM PEOPLE"
Run SQL
Change Content Type To "application/x-javascript"
Output "function my_Javascript_Function( ){
FIRST=database_info("FIRST_NAME");
LAST=database_info("LAST_NAME");}

The application-capable server 120 is adapted to parse 220 the application code from the dynamic page 182 and connect 230 to the database 130 to retrieve 240 the appropriate dynamic content and elements stored in the database 130. In the example above, the name of the user visiting the static page 180 is retrieved from the database 130. Utilizing the above sample code, the dynamic page 182 preferably changes its Multipurpose Internet Mail Extensions (MIME) content type to "application/x-javascript" so that the static page 180 calling the dynamic page 182 may treat it as if it were static content residing on the non-application capable server.

Therefore, when the static page 180 calls the "myFunction.asp" dynamic page 182, the dynamic content provided to the dynamic page 182 is incorporated 260 into the static page 180 as if it was entirely part of the static page 180 itself and from the non-application capable server 110. In the example above, the user is greeted with a personalized "Hello Username" upon visiting the Web site. In this manner, dynamic, database-driven content from external domains may be passed into, and included with, a static page 180 from a non-application capable server 110. Therefore, utilizing the system and method according to an embodiment of the present invention, additional third-party software packages are not required to store static content and dynamic content on separate servers. Static content and dynamic content do not need to be stored in the same server. As more and more content authors wish to provide a rich, personalized experience to end users, by utilizing the present invention, access to dynamic content is available to the content authors without changing their publishing methodology (i.e., going away from a non-application capable server), or having to write their own applications to access dynamic content.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A system to provide dynamic content to a static page, comprising:

a database to store the dynamic content to be incorporated into the static page;

a non-application capable server to store the static page, the non-application capable server being isolated from the database;

a dynamic page adapted to make a connection to the database, to execute an application code within the dynamic page, to query the database, to request a database element based on a cookie in a domain external to the non-application capable server, and incorporate a result of the database query into a Javascript function; and an application-capable server to store the dynamic page, to parse the application code, and to connect to the database, the static page incorporating the dynamic page to provide the dynamic content to the static page, wherein the static page includes a JavaScript reference to the Javascript function including a modular code fragment, the modular code fragment residing on the application-capable server, the cookie is stored on the application-capable server, which extracts information from the cookie and transmits the information to the static page, a Multipurpose Internet Mail Extension (MIME) content of the dynamic page has been changed to "application/x-javascript", and wherein the static page has a first connection to the non-application capable server, and the dynamic page has a second connection to the application-capable server.

2. The system according to claim 1, wherein the non-application capable server and the application-capable server are connected to a network.

3. The system according to claim 2, wherein the network is an Internet.

4. The system according to claim 1, wherein the application code is written in at least one of Visual Basic Scripting Edition (VBScript) code, JavaScript code and Perl code.

5. The system according to claim 1, wherein the static page is a HyperText Markup Language (HTML) page.

6. The system according to claim 1, wherein the dynamic page is an Active Server Page (ASP).

7. A method of providing dynamic content to a static page, the method comprising:

storing the dynamic content to be incorporated into the static page into a database;

storing the static page in a non-application capable server, the non-application capable server being isolated from the database;

storing a dynamic page in an application-capable server, wherein the application-capable server is adapted to parse an application code from the dynamic page and to connect to the database;

incorporating into the static page a JavaScript reference to a JavaScript function including a modular code fragment, the modular code fragment residing on the application-capable server;

changing a Multipurpose Internet Mail Extension (MIME) content of the dynamic page to "application/x-javascript";

executing the application code within the dynamic page;

parsing the application code;

making a connection by the application-capable server to the database;

providing the dynamic content from the database to the dynamic page, wherein the dynamic page is configured to query the database, to request a database element based on a cookie stored on the application-capable server, and to incorporate a result of the database query into the JavaScript function; and incorporating the dynamic page into the static page to provide the dynamic content to the static page, wherein the application-capable server extracts information from the cookie and transmits the information to the static page, and wherein the static page has a first connection to the non-application capable server, and the dynamic page has a second connection to the application-capable server.

8. The method according to claim 7, wherein the non-application capable server and the application-capable server are connected to a network.

9. The method according to claim 8, wherein the network is an Internet.

10. The method according to claim 7, wherein the application code is written in at least one of Visual Basic Scripting Edition (VBScript) code, JavaScript code and Perl code.

11. The method according to claim 7, wherein the static page is a HyperText Markup Language (HTML) page.

12. The method according to claim 7, wherein the dynamic page is an Active Server Page (ASP).

13. A system to display a static page having dynamic content, comprising:

a database to store the dynamic content to be incorporated into the static page;

a non-application capable server to store the static page, the non-application capable server being isolated from the database;

a dynamic page adapted to make a connection to the database, to execute an application code within the dynamic page, to query the database, to request database elements based on a cookie in a domain external to the non-application capable server, and to incorporate a result of the database query into a JavaScript function;

an application-capable server to store the dynamic page, to parse the application code, and to connect to the database, the static page incorporating the dynamic page to provide the dynamic content to the static page; and a browser to display the static page having the dynamic content, wherein the static page includes a JavaScript reference to the JavaScript function including a modular code fragment, the modular code fragment residing on the application-capable server, the cookie is stored on the application-capable server, which extracts information from the cookie and transmits the information to the static page, a Multipurpose Internet Mail Extension (MIME) content of the dynamic page has been changed to "application/x-javascript", and wherein the static page has a first connection to the non-application capable server, and the dynamic page has a second connection to the application-capable server.

14. The system according to claim 13, wherein the first connection and the second connection are a network connection.

15. The system according to claim 14, wherein the network connection is an Internet.

16. The system according to claim 13, wherein the application code is written in at least one of Visual Basic Scripting Edition (VBScript) code, JavaScript code and Perl code.

17. The system according to claim 13, wherein the static page is a HyperText Markup Language (HTML) page.

18. The system according to claim 13, wherein the dynamic page is an Active Server Page (ASP).

19. A method of displaying a static page having dynamic content, the method comprising:

providing the static page from a non-application capable server to a browser, the non-application capable server being isolated from the database;

executing an application code from a dynamic page, the dynamic page being stored on an application-capable server and configured to query the database, to request a database element based on a cookie stored on the application-capable server, and to incorporate a result of the database query into a JavaScript function;

incorporating into the static page a JavaScript reference to the JavaScript function including a modular code fragment, the modular code fragment residing on the application-capable server;

changing a Multipurpose Internet Mail Extension (MIME) content of the dynamic page to "application/x-javascript";

parsing the application code;

making a connection by the application-capable server to the database;

retrieving the dynamic content stored in the database;

providing the dynamic content to the dynamic page from the application-capable server to the browser; and incorporating the dynamic page into the static page to provide the dynamic content to the static page, wherein the application-capable server extracts information from the cookie and transmits the information to the static page, and wherein providing the static page from the non-application capable server to the browser utilizes a first connection, and providing the dynamic content to the dynamic page from the application-capable server to the browser utilizes a second connection.

20. The method according to claim 19, wherein the first connection and the second connection are a network connection.

21. The method according to claim 20, wherein the network connection is an Internet.

22. The method according to claim 19, wherein the application code is written in at least one of Visual Basic Scripting Edition (VBScript) code, JavaScript code and Perl code.

23. The method according to claim 19, wherein the static page is a HyperText Markup Language (HTML) page.

24. The method according to claim 19, wherein the dynamic page is an Active Server Page (ASP).

* * * * *